June 20, 1950  O. W. SHELOR  2,512,443
GARDEN TRACTOR
Filed March 7, 1946  3 Sheets-Sheet 1
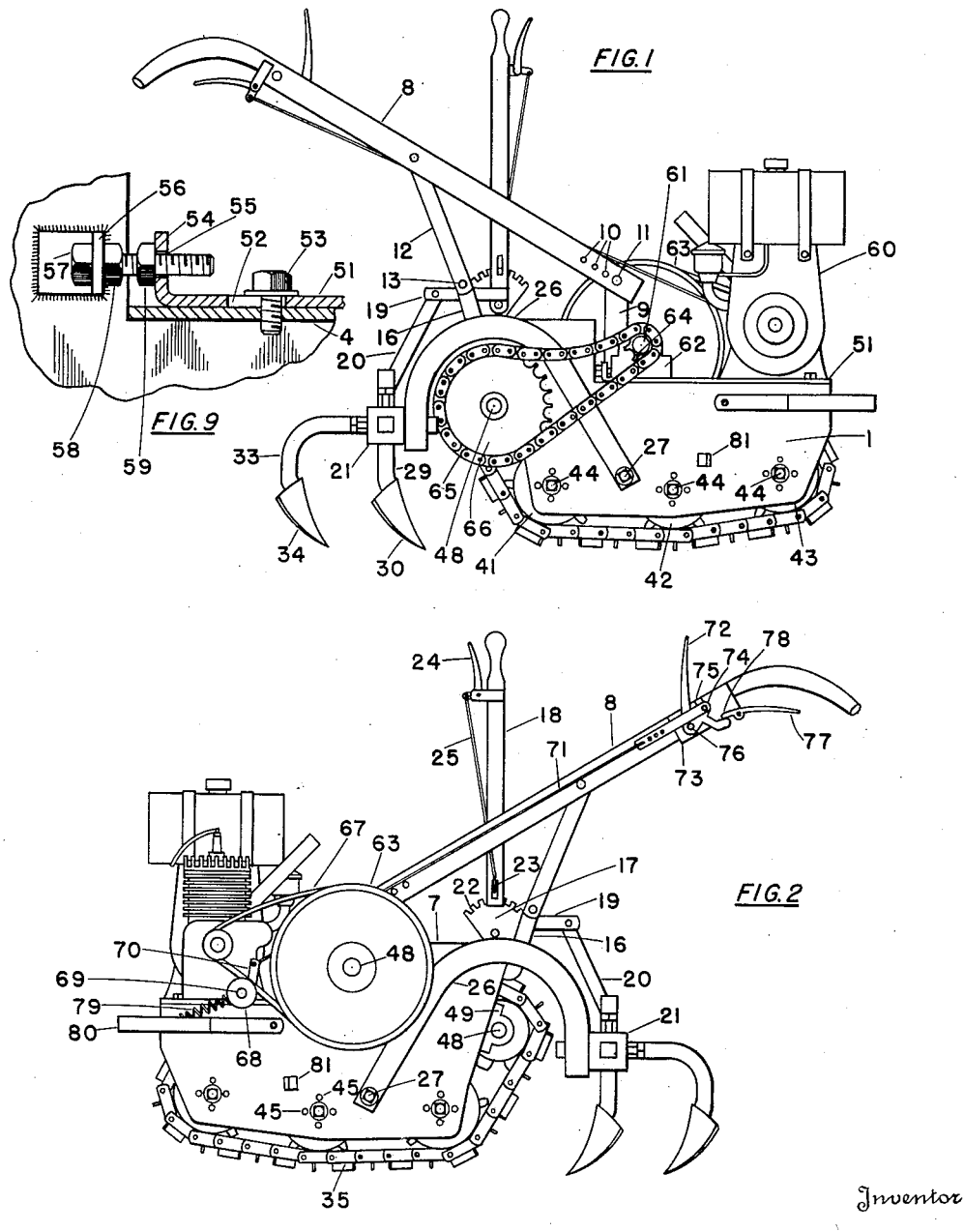
Inventor
OLIE W. SHELOR
By Mason Fenwick & Lawrence
Attorneys June 20, 1950  O. W. SHELOR  2,512,443
GARDEN TRACTOR Filed March 7, 1946  3 Sheets-Sheet 2

OLIE W. SHELOR

Inventor

By Mason Fenwick + Lawrence
Attorneys

June 20, 1950　　　　　O. W. SHELOR　　　　　2,512,443
GARDEN TRACTOR

Filed March 7, 1946　　　　　　　　　　　3 Sheets-Sheet 3

Inventor
OLIE W. SHELOR

By Mason Fenwick & Lawrence
Attorneys

Patented June 20, 1950

2,512,443

UNITED STATES PATENT OFFICE 2,512,443

GARDEN TRACTOR

Olie W. Shelor, Salem, Va., assignor of forty-nine per cent to Furman Whitescarver Application March 7, 1946, Serial No. 652,687

4 Claims. (Cl. 97—48)

This invention relates to tread type garden tractors.

One of the objects of the invention is to provide a garden tractor having a narrow tread so that the tractor can be steered by tilting it sidewise, the traction flight of the tread being longitudinally convex in a downward direction with the point of greatest depth substantially beneath the center of gravity so that the tractor can be rocked forwardly with comparatively little effort to enable it to be steered by the forward portion of the tread when the tractor is tilted in either direction.

Another object of the invention is to provide a tractor of the type described, having tread cleats positioned to compact the soil with which they intergear, laterally so as to hold the tractor from sidewise slipping, particularly when working across a slope.

A further object of the invention is to provide a tractor which travels upon continuous rails constituted by the straight sides of the tread chain links, thereby preventing vibration or bumpiness in the forwarded movement of the tractor.

Still another object of the invention is to provide a tractor resting upon the tread by means of idler gears, the teeth of which do not roll upon the chain links but merely loosely project into the link openings to guide and hold the tread in place, the driving gear the teeth of which, of course, roll upon the transverse elements of the chain links, being positioned above the traction plane, protected by virtue of its elevated position from becoming clogged by mud and clods.

Another object of the invention is to provide in a garden tractor of the type described, an implement beam pivoted close to ground level to prevent undue tendency of the implement to lift out of the ground.

A further object of the invention is to provide a spring released clutch of the belt tightener type between the engine and drive shaft, normally engaged, but tripped by a trigger to release it, this arrangement being particularly useful in connection with a governor controlled engine that speeds up upon increase in load, to prevent stalling of the engine when the tractor encounters insurmountable obstacles such as large roots.

A still further object of the invention is the provision of a unitary mount for the power plant, including the main drive shaft, separable from the tractor frame and adjustably slidable relative thereto to regulate the tautness of the driving connection between the main drive shaft and the tread driving gear.

Other objects of the invention will appear as the following description of a preferred and practical embodiment thereof proceeds.

In the drawings:

Figure 1 is a side elevation of a tractor embodying the priciples of the invention.

Figure 2 is a similar view from the reverse side:

Figure 9 is a fragmentary view in vertical section of the means for adjusting the motor base plate relative to the platform which supports it, as seen in Figures 1 and 3.

Figure 4:
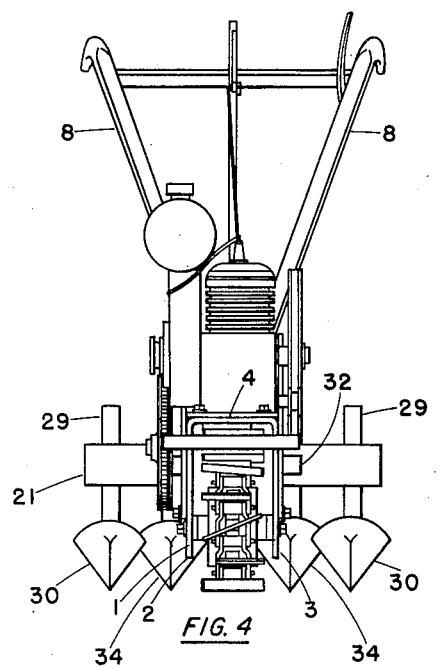
Figure 4 is a front end elevation.
Figure 5:
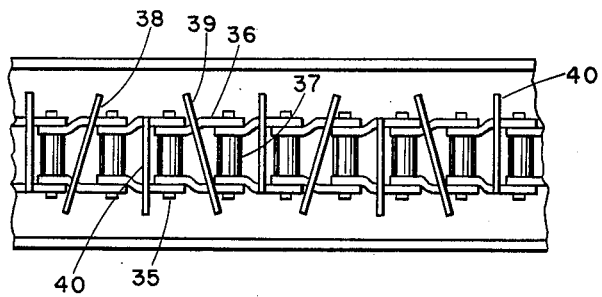
Figure 5 is a fragmentary bottom plan view of a portion of the tread.

Referring now in detail to the drawings, the numeral 1 represents in general the tractor frame which, as can be seen in Figure 4, is preferably an integral heavy sheet metal member bent in deep channel form to provide side plates 2 and 3 joined at the top by a flat portion 4, constituting a support for the removable power plant, as will appear. The forward part of the frame has the upwardly projecting integral side extensions 5 and 6 joined at the top by a plate 7, the latter forming a support for the implement lifting mechanism.

Figure 3:
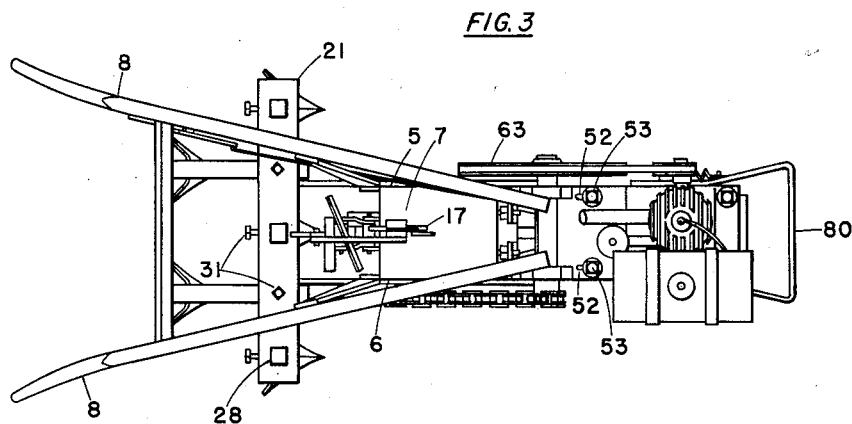
Figure 3 is a top plan view.

The tractor handle bars 8 are adjustably connected at their forward ends to the upright members 9, secured to the tractor frame, the adjustment consisting of a series of several holes 10 in the handle bars, any one of which may be engaged by a bolt 11, passing through the upright 9. Intermediately the handle bars 8 are each supported by a strut 12, having an intermediate pivotal joint 13 and having its lower portion 16 rigidly secured, as by welding, to the extensions 5 of the tractor frame. The struts 12 cooperate with the adjustment at the forward ends of the handle bars to raise or lower the handles. On top of the plate 7 in a middle position, as shown in Figure 3, a bracket 17 is welded or otherwise secured forming the pivotal connection for a bell crank lever 18, the lower arm 19 of which is connected by the link 20 to the middle portion of the implement bar 21 to lift the latter when the lever 18 is pushed forwardly. The top of the bracket 17 is formed as a toothed sector 22 engaged by a pawl 23 carried by the lever 18 and actuated through the lever 24 and connecting rod 25 to hold the lever 18 in fixed position.

The implement bar 21 is carried at the rear ends of curved arms 26 which are deeply convex in an upward direction and pivotally mounted at their opposite ends to the opposite sides 2 and 3 of the tractor frame at the points 27 close to ground level so as to inhibit the undue tendency of the implements to rise out of the ground.

The implement beam 21 is preferably a hollow rectangular tube having aligned openings 28, through its upper and lower walls at spaced intervals, three of such openings being shown in the drawings to receive the shanks 29 of cultivating implements such as the hoes 30. The openings are preferably but not necessarily polygonal in shape, to prevent rotation of the stems 29, the latter being secured by the set screws 31. The implement beam 21 is further provided with similar aligned openings 32 in its front and back walls, in alternate arrangement with the openings 28 to receive the shanks 33 of the hoes 34. The shanks 33 are longer than the shanks 29 and more deeply curved so as to bring the hoes 34 to the rear of the hoes 30.

Figure 6:
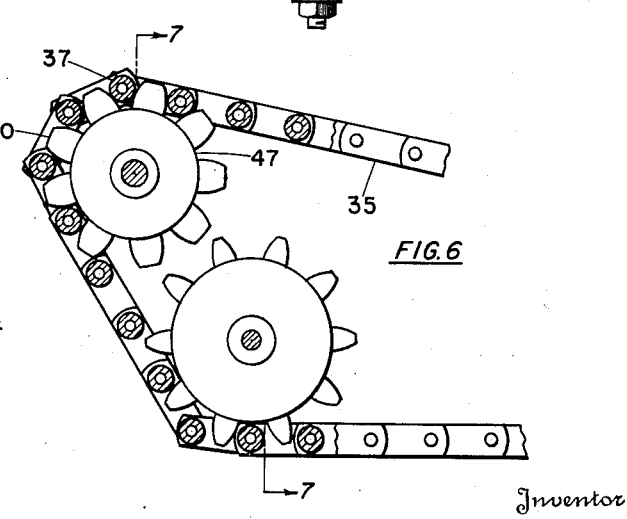
Figure 6 is a fragmentary view in side elevation illustrating the difference in the relation of the driving gear and idler gears to the tread chain.

The tractor is driven upon an endless tread which in general is designated by the reference character 35, and comprises a chain having links, the side members 36 of which are straight in a vertical plane, as shown in Figure 6. The side members 36 are pivotally connected at the ends of the transverse rollers 37 in conventional manner. Oppositely inclined cleats 38 and 39 are fastened to the outer edges of the side members 36 by welding or casting of alternate links. The oppositely inclined relation of adjacent links 38 and 39 forms alternate wide and narrow spaces between the cleats on each side of the tread. To prevent the weight of the tractor from causing the tread to sag in the span between the wider spaces, a short cleat 40, uniform in height with the other cleats, is welded to the side members of the intervening link, so as to project only into the wider spaces. This cleat is arranged perpendicular to the direction of travel of the tread, and in effect forms the bisector of the angle between adjacent inclined cleats.

It is obvious that any tendency of the tread to slip laterally relative to the ground with which the cleats are inter-engaged will cause a wedging action of the soil which lies between adjacent inclined cleats which will compact the soil and resist such tendency to slippage. This keeps the tractor from sliding laterally when working across a slope.

The tractor rests upon the tread by means of the three idler gears 41, 42 and 43, journaled upon rods 44, the ends of which pass through apertures in the side plates 2 and 3 and are secured by nuts. To provide adjustment for these idler gears, there are several apertures 45 in vertical and horizontal series, into any one of which the rods 44 may be secured. It will be noted that the middle idler gear 42 normally projects downwardly to a greater depth than the end idlers 41 and 43, thus giving a longitudinal "crown" or "rocker" to the lower or traction flight of the tread. The middle idler gear 42 is substantially beneath the center of gravity of the tractor so that the weight of the tractor is substantially evenly balanced on opposite sides of the axis of this gear. The ground engaging portion of the tread may be regarded as being differentiated into two flat traction flights, one between the front and intermediate idler gears 41 and 42 and the other between the intermediate and rear idlers, assuming the tractor to be in a position of substantially unstable balance with the points of the shovels touching ground; only the middle part of the tread, beneath the middle idler 42, will be pressing the ground. The operator first presses down the handles slightly to cause the shovels to penetrate. Then the shovels will begin to resist the forward movement of the tractor, and since the pivotal connections of the implement beams 26 is above and to the rear of the axis of the intermediate idler 42, the resistance of the shovels will tilt the tractor down toward the rear until the rear traction flight of the tread is pressing on the soil throughout its whole area. Beyond this position, the tractor will not tilt, so that the shovels remain at a fixed depth within the soil.

When the soil is very soft and loose, the shovels may tend to pull out of the ground, but under this condition of soil the weight of the tractor sinks the rear traction flight of the tread to a slight depth beneath the surface so that a portion of the upwardly inclined forward flight is engaging the soil in an upwardly inclined plane, which keeps the tractor tilted rearwardly and holds the shovels at their depth, countering the tendency to pull out of the soil.

When the tractor, riding solely upon the rear traction flight of the tread is tilted laterally to right or left, it will steer to one side because the cleats on that one dig deeper than on the opposite side, the line of greatest traction being offset laterally from the middle longitudinal vertical plane through the tractor. However, the radius of the steering arc is greatly shortened by tilting the tractor forwardly by slight upward pressure upon the handles to bring more or less of the upwardly inclined forward traction flight against the ground, and then tilting the tractor laterally. This throws the forward flight to the right or left, as the case may be, resulting in quick deflection of the tractor. By this means it is possible to cultivate a row of corn by steering the tractor in a sinuous path around alternate sides of successive stalks along the row, then turning the tractor around and steering it in a similar path around the other alternate sides of the stalks.

It will be obvious from Figure 6 that where the drive chain passes around the drive gear 47, adjacent links are angularly disposed so that a straight line joining the outer pivots of two adjacent links will be a chord of the pitch line determined by the axes of the links and less than the sum of the lengths of said adjacent links; but that where the chain travels in a straight flight, a straight line between the outer pivots of the adjacent links will be equal to the sum of the lengths of said links. Consequently, if the idler gears 41, 42 and 43 which operate upon straight flights of the chain were identical with the drive gear 47, the teeth of the idler gears would not be synchronized with the openings in the links, since there would be an accumulative gain in the presentation of the links in the straight flights to the teeth of the idler gears. This would cause the teeth of the idlers to ride up upon the rollers of the links until the freely turning idlers slip back in place, giving objectionable vertical vibration or bumpiness in the operation of the tractor. Therefore, the idler gears have a tooth spacing which meshes the link openings in the straight flights of the chain, that is, the tooth spacing is slightly greater than that of the driving gear, and preferably the teeth have a width which is a loose fit within the meshes of the chain, assuring that the teeth will not tend to ride the rollers, notwithstanding variations in the angularity of adjacent straight traction flights, incident to adjustment of the "rocker" on the lower traction portion of the tread. The idler gears function solely to guide and hold the tread in place upon the gears. The gears are provided laterally on opposite sides of the teeth with circular peripheral flanges 46 which rest upon the side members 35 of the chain. Since these side members are straight, they form a continuous straight track upon which the peripheral flanges 46 smoothly roll, thus avoiding vibration or bumpiness which characterizes those tractors in which the gear teeth ride upon the chain.

The tread 35 passes about a drive gear 47, which is carried by a post 48, mounted in bearings 49, secured to the opposite side frame plates 2 and 3 at their rearward ends. This gear is positioned at a considerable distance above ground level where it is protected from being clogged with mud and debris lifted by the tread. Substantially all of such obstructive matter falls from the tread in that part of its travel from the idler gear 41 to the drive gear 47. The teeth 50 of the drive gear fit the chain links and ride upon the rollers 37. This gear does not have lateral flanges which contact the side link members 35.

The power plant comprises a base plate 51, which rests upon the platform 4. It has longitudinal slots 52, through which bolts 53 pass, said bolts screwing into holes in the platform 4. At its rear end the base plate 51 has an upturned flange 54, provided with holes 55. The extensions 5 and 6 of the tractor frame have lugs 56 stamped out perpendicularly thereto, said lugs being formed with apertures which align with the holes 55. Bolts 57 pass through the apertures in said lugs, each having a nut 58 screwed up tight against the lug 56, to hold the bolt in position. The bolts are also provided with traveling nuts 59, and the free ends of the bolts pass through the apertures 55 in the base plate. The traveling nuts 59 provide an adjustable abutment for the flange 54, by means of which the longitudinal adjustment of the power plant upon the platform 4 is determined. When in adjusted position the bolts 53 are screwed tight, fixing the position of the power plant. The power plant comprises an internal combustion motor 60, mounted upon the base plate 51 and a main drive shaft 61 journaled in bearings 62, also fixed to the base plate. The drive shaft 61 carries a large pulley 63, which is belt driven from the shaft of the motor, providing considerable gear reduction. The drive shaft 61 also carries a sprocket 64 on which is mounted a chain 65 which connects the driving shaft with a sprocket 66 on the shaft 48 of the drive gear 47. The tautness of the chain 45 is regulated by adjusting the longitudinal position of the power plant in the manner above described.

The motor is not part of the present invention, and therefore need not be specifically described. It is preferably of that commonly known type which is controlled by a governor so as to increase the speed of the motor when the load increases. Thus, when the tractor encounters an obstruction in the ground, the motor speed automatically increases to give more power to overcome the obstruction. Ordinarily, in known garden tractors, if the obstruction is insurmountable, it inevitably causes the motor to stall. This is a great nuisance, for it involves frequently restarting the motor. In the present invention, stalling of the motor is avoided by the following control. The belt 67, which drives the pulley 63 from the motor shaft, is loose enough to slip. It is brought into operative engagement with the pulley 63 by means of a belt tightening pulley 68, mounted on a pin 69, carried by one end of a bell crank 70, pivotally mounted on the motor base. The other arm of the bell crank 70 is connected by means of a rod 71 to a locking lever 72, pivotally mounted on a plate 73 secured to one of the handle bars 8 adjacent the handle. The lever 72 has a curved end 74, to which the rod 71 is pivotally connected. When the lever 72 is pushed forwardly against a stop 75 on the plate 73, the pivotal connection between the rod 71 and lever 72 is moved beyond the dead center represented by the pivotal connection 76 of the lever 72 with the block 73. This movement rocks the bell crank 70 so as to bring the pulley 68 into tightening engagement with the belt 67 and locks it in that position. This is the normal position of the parts in the operation of the tractor. The belt tightening pulley is released by means of a trigger consisting of a curved lever 77, pivotally mounted upon the plate 73, having one end 78 positioned to engage the curved end 74 of the lever 72 and throw it into release position with respect to the dead center 76 when the trigger is pulled. When the tractor meets an obstruction, the motor speeds up and the additional power thereby provided automatically overcomes the obstruction. However, if the motor beings to labor, the operator quickly pulls the trigger, releasing the pulley 68, which is retracted by means of the spring 79, which is anchored at one end to the tractor frame and connected at the other end to the bell crank 70. This releases the motor from all load and it recovers without stalling. The tractor is then manually tilted or pulled back so as to avoid the obstruction and driving operation resumed by again pushing the lever 72 forward.

At its front end the tractor is provided with a flat bottomed U-shaped stand 80, the sides of which are pivotally connected to the opposite side plates 2 and 3 of the tractor frame. When in its lowered position, the stand encounters stops 81 on the tractor frame, and becomes a stable support for the tractor. When in elevated position, it constitutes a handle by means of which the forward end of the tractor may be lifted.

Figure 8:
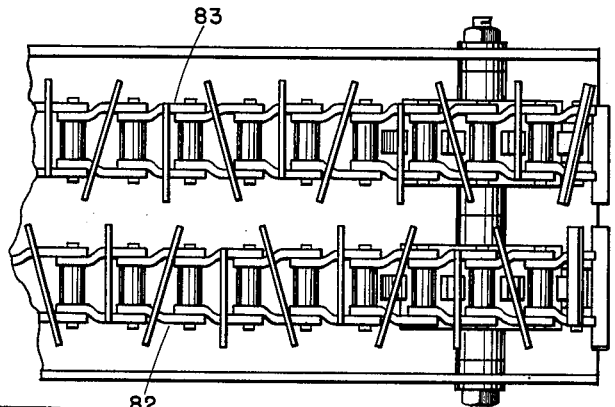
Figure 8 is a fragmentary bottom plan view of a modification showing a double tread.
Figure 7:
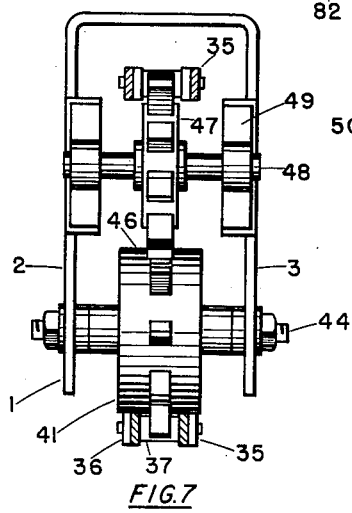
Figure 7 is a sectional view taken along the line 7—7 of Figure 6.

Figure 8 shows a slight modification of the invention in which two parallel treads 82 and 83 may be employed, each identical with the single tread 35, but which may be narrower and slightly spaced. These give a somewhat wider base of support and ease the burden of holding the tractor upright for straightaway travel, and make possible a multiplication in the number of cleats, which may to some extent improve the traction.

The unbroken earth ridge between the treads may be of advantage in holding the tractor to a straight course, particularly when crossing a slope. The cleats themselves have a cultivating function in breaking the surface crust, and a finer comminution of the crust is possible where a double treat is employed, than in the case of a single tread. Duplication of the idler and driving gears is of course required for the use of the double tread.

While I have in the above description disclosed what I believe to be a preferred and practical embodiment of the invention, it will be understood by those skilled in the art that the specific details of construction and arrangement of parts are by way of illustration and not to be construed as limiting the scope of the invention.

What I claim as my invention is:

1. A garden tractor comprising a frame including side members and having operating handles at the rear thereof, spaced front and rear idler gears and an intermediate idler gear all supported by said side members and journaled therebetween, a drive gear, an endless tread comprising a chain with traction cleats passing about said gears in mesh therewith and of such width as to be within the confines of said side members, said intermediate idler gear extending depthwise below said front and rear idler gears giving a longitudinal rocker action to the traction flight of said tread, the shape of said tread defining forward and rearward straight traction portions upwardly inclined from an apex, an implement beam extending rearwardly of said frame having its forward end pivoted thereto at a point between the axes of said intermediate and rear idler gears and above a plane embracing said axes whereby the drag of ground penetrating implements carried by said implement beam causes said tractor to ride upon said rearward traction portion, said tractor being tiltable forwardly about said apex by upward pressure on said handles to bring at least part of said forward traction portion into ground engagement, to enable steering by tilting said tractor laterally.

2. A garden tractor as claimed in claim 1, in which the intermediate idler gear is adjustable in a vertical direction to vary the angle of the apex.

3. A garden tractor comprising a frame having side members, spaced front and rear idler gears supported by said side members and journaled therebetween, a drive gear mounted on said frame above said idler gears, an endless tread comprising a chain with traction cleats passing about said front and rear idler gears and said drive gear in mesh therewith and having such width as to be within the confines of said side members, an intermediate idler gear also supported by said side members and journaled therebetween projecting vertically downward further than said front and rear idler gears and in mesh with said tread chain giving a longitudinal rocker action to the traction flight of said tread, said chain having straight sided links the sides of which form a track, said idler gears having circular flanges that ride upon said track whereby said chain rides with its pitch line offset with respect to the pitch line of said idler gears.

4. A garden tractor comprising a frame and side members, spaced front and rear idler gears supported by said side members and journaled therebetween, a drive gear mounted on said frame above said idler gears, an endless tread comprising a chain with traction cleats passing about said front and rear idler gears and said drive gear in mesh therewith and having such width as to be within the confines of said side members, an intermediate idler gear also supported by said side members and journaled therebetween projecting vertically downward further than said front and rear idler gears in mesh with said tread chain giving a longitudinal rocker action to the traction flight of said tread, said chain having straight sided links the sides of which form a track, said idler gears having circular flanges that ride upon said track, said chain turning about said drive gear on a pitch line determined by the axes of said links, the teeth of said idler gears being spaced apart a greater distance than the teeth of said drive gear to secure accurate mesh with the straight portions of the traction flight of said chain.

OLIE W. SHELOR.

REFERENCES CITED

The following references are of record in the file of this patent:

UNITED STATES PATENTS

| Number | Name | Date |
|---|---|---|
| 1,207,335 | Siebenhaar | Dec. 5, 1916 |
| 1,222,546 | Hamilton | Apr. 10, 1917 |
| 1,302,317 | Cowan | Apr. 29, 1919 |
| 1,330,253 | Fuller | Feb. 10, 1920 |
| 1,359,538 | Savage | Nov. 23, 1920 |
| 1,424,493 | Leyner | Aug. 1, 1922 |
| 1,443,951 | George | Feb. 6, 1923 |
| 1,450,385 | Prince | Apr. 3, 1923 |
| 1,722,531 | Matter | July 30, 1929 |
| 2,046,560 | Johnson et al. | July 7, 1936 |
| 2,052,068 | Ziegler | Aug. 25, 1936 |
| 2,091,823 | Large | Aug. 31, 1937 |
| 2,211,260 | Donald | Aug. 13, 1940 |

FOREIGN PATENTS

| Number | Country | Date |
|---|---|---|
| 847,233 | France | Oct. 5, 1939 |